(12) United States Patent
Shi et al.

(10) Patent No.: US 10,796,205 B2
(45) Date of Patent: Oct. 6, 2020

(54) MULTI-VIEW VECTOR PROCESSING METHOD AND MULTI-VIEW VECTOR PROCESSING DEVICE

(71) Applicant: FUJITSU LIMITED, Kawasaki-shi, Kanagawa (JP)

(72) Inventors: Ziqiang Shi, Beijing (CN); Liu Liu, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 179 days.

(21) Appl. No.: 15/971,549

(22) Filed: May 4, 2018

(65) Prior Publication Data

US 2018/0336438 A1    Nov. 22, 2018

(30) Foreign Application Priority Data

May 16, 2017    (CN) .......................... 2017 1 0343390

(51) Int. Cl.
    *G06K 9/62*    (2006.01)
    *G06K 9/48*    (2006.01)
    *G10L 17/00*    (2013.01)

(52) U.S. Cl.
    CPC ........... *G06K 9/6277* (2013.01); *G06K 9/481* (2013.01); *G06K 9/6215* (2013.01); *G06K 9/6256* (2013.01); *G06K 9/6262* (2013.01); *G10L 17/00* (2013.01)

(58) Field of Classification Search
    None
    See application file for complete search history.

(56) References Cited

U.S. PATENT DOCUMENTS

| 2009/0089023 A1* | 4/2009 | Watanabe | .............. G06Q 10/04 703/2 |
| 2015/0154192 A1* | 6/2015 | Lysne | ............... G06F 16/24578 707/748 |

OTHER PUBLICATIONS

Extended European Search Report dated Oct. 15, 2018 in related European Patent Application No. 18170784.5 (8 pages).

(Continued)

*Primary Examiner* — Randolph I Chu
(74) *Attorney, Agent, or Firm* — Staas & Halsey LLP

(57) ABSTRACT

A multi-view vector processing method and a multi-view vector processing device are provided. A multi-view vector x represents an object containing information on at least two non-discrete views. A model of the multi-view vector, where the model includes at least components of: a population mean μ of the multi-view vector, view component of each view of the multi-view vector and noise $\epsilon$ is established. The population mean μ, parameters of each view component and parameters of the noise $\epsilon$, are obtained by using training data of the multi-view vector x. The device includes a processor and a storage medium storing program codes, and the program codes implements the aforementioned method when being executed by the processor.

18 Claims, 5 Drawing Sheets

(56) References Cited

OTHER PUBLICATIONS

Zigiang Shi et al.; *"Multi-view probability linear discrimination analysis for Multi-view vector based text dependent speaker verification"*; Apr. 21, 2017 (Apr. 21, 2017), XP055512539, retrieved from the Internet: URL:http://pdfs.semanticscholar.org/4063/92bed33855e06f8e013791f2f4f3875f6878.pfd (retrieved on Oct. 4, 2018). (8 pages).

Nanxin Chen et al.; *"Multi-Task Learning for Text-dependent Speaker Verification"*; Sep. 6, 2015 (Sep. 6, 2015), XP055512911, retrieved from the Internet: URL:http://or.nsfc.gov.cn/bitstream/00001903-5/414669/1/1000014214322.pdf (retrieved on Oct. 5, 2018); section 4.2 (8 pages).

\* cited by examiner

|  | $u_1$ | $u_2$ |
|---|---|---|
| $v_1$ | $x_{111}, x_{112}, \ldots, x_{11n}$ | $x_{211}, x_{212}, \ldots, x_{21n}$ |
| $v_2$ | $x_{121}, x_{122}, \ldots, x_{12n}$ | $x_{221}, x_{222}, \ldots, x_{22n}$ |
| $v_3$ | $x_{131}, x_{132}, \ldots, x_{13n}$ | $x_{231}, x_{232}, \ldots, x_{23n}$ |

Figure 1

|  | Null | $u_1$ | $u_2$ |
|---|---|---|---|
| Null | Null | $x_{101}, x_{102}, \ldots, x_{10n}$ | $x_{201}, x_{202}, \ldots, x_{20n}$ |
| $v_1$ | $x_{011}, x_{012}, \ldots, x_{01n}$ | $x_{11n} = x_{10n} + x_{01n}$ | $x_{21n} = x_{20n} + x_{01n}$ |
| $v_2$ | $x_{021}, x_{022}, \ldots, x_{02n}$ | $x_{12n} = x_{10n} + x_{02n}$ | $x_{22n} = x_{20n} + x_{02n}$ |

Figure 2

MULTI-VIEW VECTOR PROCESSING METHOD AND MULTI-VIEW VECTOR PROCESSING DEVICE

CROSS-REFERENCE TO RELATED APPLICATIONS

This application claims the priority benefit of Chinese Patent Application No. 201710343390.6, filed on May 16, 2017 in the Chinese State Intellectual Property Office, the disclosure of which is incorporated herein in its entirety by reference.

FIELD

The present disclosure relates to the field of information processing, and in particular to analysis and comparison of multi-view vectors.

BACKGROUND

Extracted and used features in various pattern recognition technologies are generally intuitive and discrete features. For example, a shape feature and a texture feature of an object are discrete. That is, only the shape of the object may be considered without considering the texture of the object (a texture item is zero), or, only the texture of the object is considered without considering the shape of the object (a shape item is zero). For another example, a result waveform obtained by superimposing waveforms in frequency domain seems to be inseparable. However, a high-frequency component and a low-frequency component of the result waveform can be separated and exists independently. In other words, one component is zero with respect to another component. In this case, each of the independent features may be respectively modeled, and the obtained models are simply superimposed.

SUMMARY

In the following, an overview of the present disclosure is given simply to provide basic understanding to some aspects of the present disclosure. It should be understood that this overview is not an exhaustive overview of the present disclosure. It is neither intended to determine a critical part or an important part of the present disclosure, nor to limit the scope of the present disclosure. An object of the overview is only to give some concepts in a simplified manner, which serves as a preface of a more detailed description described later.

A multi-view vector processing method is provided according to an aspect of the present disclosure. A multi-view vector x represents an object containing information on at least two non-discrete views. The method includes: a modeling step for establishing a model of the multi-view vector, where the model includes at least components of: a population mean $\mu$ of the multi-view vector, view component of each view of the multi-view vector and noise $\epsilon$; and a training step for obtaining the population mean $\mu$, parameters of each view component, and parameters of the noise $\epsilon$, by using training data of the multi-view vector x.

A multi-view vector processing device is further provided. The device includes a processor and a storage medium storing program codes, where the program codes implements the above method when being executed by the processor.

Corresponding computer program codes, a computer readable storage medium and a computer program product are provided according to other aspects of the present disclosure.

With the multi-view vector processing method and multi-view vector processing device according to the present disclosure, multiple views which are relatively non-discrete can be separated by modeling. Then, whether each view component is the same in different multi-view vectors is determined with the obtained models. For example, the obtained models are used for voiceprint confirmation.

Hereinafter, preferred embodiments of the present disclosure are described in detail in conjunction with the drawings, and these and other advantages of the present disclosure become more apparent.

BRIEF DESCRIPTION OF THE DRAWINGS

To further set forth the above and other advantages and features of the present disclosure, detailed description of the embodiments of the disclosure will be made in the following in conjunction with the drawings in which like reference signs designate components having like function and structure. The drawings, together with the detailed description below, are incorporated into and form a part of the specification. It should be noted that the drawings only illustrate typical embodiments of the present disclosure and should not be construed as a limitation to the scope of the present disclosure. In the drawings:

FIG. 1 is a schematic table of relatively non-discrete components;

FIG. 2 is a schematic table of relatively discrete components;

DETAILED DESCRIPTION OF EMBODIMENTS

Figure 3:
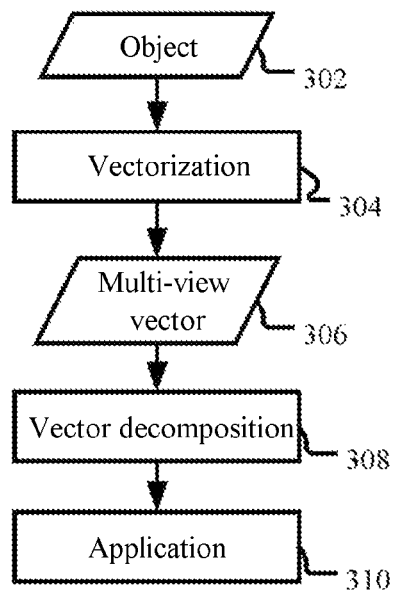
FIG. 3 is a schematic flowchart of a multi-view vector processing method according to a disclosed embodiment.
Figure 4:
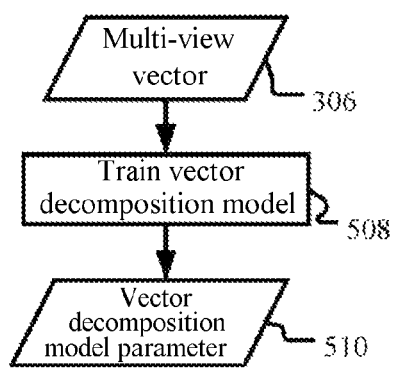
FIG. 4 is a schematic flowchart of a multi-view vector processing method according to a disclosed embodiment.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that, in order to avoid obscuring the present disclosure due to unnecessary details, only a device structure and/or processing steps closely related to the solution according to the present disclosure are illustrated in the drawings, and other details having little relationship to the present disclosure are omitted.

The description below is in the following order:
1. Modeling of multi-view vector
2. Application of multi-view vector model
3. Extraction of multi-view vector
4. Multi-view vector processing device
5. Computing device for implementing device and method according to the present disclosure 1. Modeling of Multi-view Vector As mentioned in the background, the intuitive and discrete features may be respectively modeled and then superimposed simply. However, there are still non-discrete features to be extracted and used. In this case, a modeling is performed only depending on features associated with the features to be extracted and used according to the conventional technologies. For example, in speech recognition, a large quantity of training can only be performed by taking recognition content as a training target for extracting various features, and it is impossible to eliminate effects caused by different persons. In this case, it takes a not short time for training and adaption when a speech recognition product is used by different persons. This is because the speech content and a vocal organ of a specific person are non-discrete. For example, in language content recognition, a certain sentence is necessarily said by a certain person, that is, a sentence can not exist independent of a person. In human identity recognition, a voiceprint is necessarily extracted from an utterance.

Similarly, an interleaving of language, age, sex, speech content and the identity of a person is further included, as well as an interleaving of age, sex, race and identity in an application associated with image recognition, and the like.

In other words, in the case that voice or image of a person is represented with one feature vector, the above factors must exist in the feature vector and the feature vector is called as "multi-view vector". For example, the speech content, the language, age, sex, race and the like each are an non-discrete "view", that is, there is necessarily a certain option for each view and the option can not be zero. Specifically, a sentence is necessarily said by person A, person B or . . . , and can not be said by "no body" (in this case, a robot is also a "person", that is to say, the sentence is necessarily said by a certain entity). For voiceprint extraction, a person necessarily speaks and it is impossible for the person not to speak, that is, the view of speech content can not be zero.

FIG. 1 and FIG. 2 further illustrates non-discrete views and discrete views. FIG. 1 represents two views u and v which are non-discrete, that is, the two views always exist in an associated and non-discrete manner. The view u always includes a certain option such as $u_1$ or $u_2$, and can not be null or zero. The view v always includes a certain option such as $v_1$, $v_2$ or $v_3$ and can not be null or zero (of cause, the number of views of u or v is unnecessarily limited). A to-be-researched object or information x may be generated by a combined effect of the two views. For example, $x_{11n}$ may be generated by $u_1$ and $v_1$ (n is a natural number representing a different sample), and the like.

In FIG. 2, view u and view v are discrete. It means that each of the views is possible to be null or zero while the other view may exist independently. In this case, a research object or information formed when the two views exist simultaneously may be actually represented as a sum of the two views. For example, an information sample $x_{21n}$ generated by special selection $u_2$ of the view u and special selection $v_1$ of the view v may be represented as a sum of information $x_{20n}$ and information $x_{01n}$. The information $x_{20n}$ is generated independently by $u_2$ and the information $x_{01n}$ is generated independently by $v_1$.

Of course, the concepts of "discrete" and "non-discrete" herein should not be absolutized, and there may be some cases in which features are low entangled although they can not be absolutely discrete. In this case, whether the features are considered as discrete or non-discrete may depend on actual requirements.

The present disclosure targets to a multi-view vector containing information on multiple (relatively) non-discrete views. The multi-view vector may be acquired in any traditional manner. For example, as shown in FIG. 3, object or information to be processed (302) may be directly vectorized in any manner (304) to obtain a multi-view vector (306). For example, acquired voice data may be processed in the following way. The voice data is divided into signals with a frame length of 25 milliseconds and a frame offset of 10 milliseconds. A feature of 39 dimensions may be obtained by extracting 13-dimensional Meyer frequency cepstrum coefficients (MFCCs) and connecting the first order differences and second order differences of the coefficients. A vector of 1521 dimensions obtained by joining with the context, that is, totally 39 frames (left 25 frames, right 13 frames), is taken as the final feature with totally 1521 dimensions (39*39). The vector can serve as a processing object according to the technical solution of the present disclosure. Of course, it can be understood by those skilled in the art that, the voice data may be processed with other methods known in the art, which will not be described hereinafter. Meanwhile, of course, the vectorization process is not limited to speech data.

After the multi-view vector is obtained (306), a vector decomposition may be performed with the method according to the present disclosure (308) to perform a specific application (310). New solutions are also provided for a method for vectorization (304), a method for vector decomposition (308) (i.e., the modeling of multi-view vector) and the application (310), according to the present disclosure. Below, a new vector decomposition method according to the present disclosure, i.e., a multi-view vector modeling method, is firstly discussed. According to the present disclosure, a vector decomposition model is established or trained (508) for the multi-view vector (306) by applying the method according to the present disclosure, to obtain a vector decomposition model parameter (510). The vector decomposition (308) can be performed by using the model parameter (510). In an application aspect, the model parameter (510) can also be directly applied in an application (310), since it is unimportant whether there is an "apparent" vector decomposition (308) after the model parameter is obtained (510). In some models, the model parameter (510) is directly applied to a certain application of researched object information, that is, the object information is applied after being decomposed.

A multi-view vector processing method is provided according to an embodiment of the present disclosure. A multi-view vector x represents an object containing information on at least two non-discrete views. The method includes: a modeling step for establishing a model of the multi-view vector, where the model includes at least components of: a population mean $\mu$ of the multi-view vector, view component of each view of the multi-view vector and noise $\epsilon$; and a training step for obtaining the population mean $\mu$, parameters of the view components, and parameters of the noise $\epsilon$, by using training data of the multi-view vector x. In the embodiment, the following model is established for the multi-view vector x, and a model parameter is obtained by training, thereby obtaining effects of view components of the multi-view vector x.

$$x = \mu + \sum_i Ci + \epsilon \qquad (1)$$

In expression (1), Ci represents a view component of a view, and i represents a sequence number of the view.

It is appreciated by the inventor that, the population mean may also be allocated to the view component. Therefore, in an embodiment, the population mean $\mu$ is set as zero, and the model may change to be:

$$x = \sum_i Ci + \epsilon \qquad (2)$$

In addition, the view component Ci may be considered as a product of a space basis $S_i$ corresponding to the view and a coefficient $u_i$ specially selected for the view, where i represents the sequence number of the view. That is, $$x = \mu + \sum_i S_i u_i + \epsilon \qquad (3)$$

It may be considered that the noise meets a Gauss distribution taking a diagonal matrix $\Sigma$ as a covariance.

The training step may include: obtaining the population mean $\mu$, space base $S_i$ of the views, and the $\Sigma$, based on the training data by using an expectation-maximization algorithm. Specifically, mean expected values of all samples for x with respect to the special selections for the view components and expected values related to covariance with respect to the special selections for the view components can be calculated based on $\mu$, $S_i$ and $\Sigma$, and $\mu$, $S_i$ and $\Sigma$ are recalculated based on the expected values until they converge.

For convenience of description, only two views are taken as an example. For example, a voiceprint (i.e., multi-view vector) extracted from a voice containing two views of speaker and text is taken as an example. In a case that training data includes I speakers, J types of texts, and each type of text for each speaker corresponds to $H_{ij}$ voice segments. A multi-view voiceprint corresponding to a k-th voice segment for a j-th type of text of an i-th speaker is represented as $x_{ijk}$, then expression (3) may be represented as:

$$x_{ijk} = \mu + Su_i + Tv_j + \epsilon_{ijk} \qquad (4)$$

In expression (4), $\mu$ represents an average value of all $x_{ijk}$, that is, population mean. S and T respectively represent a space basis of the speaker view and a space basis of the text view. A coefficient corresponding to an i-th selection for the view corresponding to S is $u_i$, and a coefficient corresponding to a j-th selection for the view corresponding to T is $v_j$. $\epsilon_{ijk}$ represents a noise signal (meeting the Gauss distribution taking a diagonal matrix $\Sigma$ as a covariance). The parameter k represents a k-th sample under the above selections. It is assumed $\theta = \{\mu, S, T, \Sigma\}$, including all parameters in the multi-view vector model, and it is assumed B=[S T] for simplifying the description below. It is assumed the parameters in the model meet the following distribution:

$$P(x_{ijk}|u_i, v_j, \theta) = \mathcal{N}(x_{ijk}|\mu + Su_i + Tv_j, \Sigma),$$

$$P(u_i) = \mathcal{N}(u_i|0, I),$$

$$P(v_j) = \mathcal{N}(v_j|0, I), \qquad (5)$$

In expression (5), $\mathcal{N}(x|\mu, \Sigma)$ represents a normal distribution with a mean of $\mu$ and a variance of $\Sigma$. That is to say, in the case of the parameter $\theta$ and the special selections $u_i$ and $v_j$ for the two views S and T, a distribution of the multi-view vector $x_{ijk}$ is a normal distribution with a mean of $\mu + Su_i + Tv_j$ and a variance of $\Sigma$, and each of $u_i$ and $v_j$ is a normal distribution with a mean of 0 and a variance of unit matrix I.

A basic process of the aforementioned maximum expected value algorithm is as follows.

Firstly, the parameter $\theta$ is initiated randomly as $\theta = \{\mu, S, T, \Sigma\}$.

Then, for all of the I speakers and J types of texts in the training data, and the multi-view vector (voiceprint) $X = \{x_{ijk}: i=1, \ldots, I; j=1, \ldots, J; k=1, \ldots, H_{ij}\}$ of the $H_{ij}$ voice segments corresponding to each speaker for each type of text, it is calculated, $$E_{Z|X,\theta_t}\left\{\begin{bmatrix} u_i \\ v_j \end{bmatrix}\right\} = E_{Z|X,\theta_t}[z_{ij}] = \left(I + B^T \sum\nolimits^{-1} B\right)^{-1} B^T \sum\nolimits^{-1} \sum_{k=1}^{H_{ij}} (x_{ijk} - \mu) \qquad (6)$$

and $$E_{Z|X,\theta_t}\left\{\begin{bmatrix} u_i u_i^T & u_i v_j^T \\ v_j u_i^T & v_j v_j^T \end{bmatrix}\right\} = \qquad (7)$$

$$E_{Z|X,\theta_t}[z_{ij} z_{ij}^T] = \left(I + B^T \sum\nolimits^{-1} B\right)^{-1} + E_{Z|X,\theta_t}[z_{ij}] E_{Z|X,\theta_t}[z_{ij}]^T.$$

Expression (6) represents mean expected values of all samples of X, and expression (7) represents an expected value, related to covariance, of the special selection for a view component of a view. $\theta_t$ represents a parameter $\theta$ in a t-th step. In an initial cycle, that is, t=1, $\theta_t$ is an arbitrarily selected initial value as described in the above. In the expressions, $Z = \{z_{ij}: i=1, \ldots, I; j=1, \ldots, J\}$, $$z_{ij} = \begin{bmatrix} u_i \\ v_j \end{bmatrix},$$

U represents a set of variables $u_i$, V represents a set of variables $v_j$, and a relationship between Z, U and V may be represented as a multiplication, x, relationship, that is, Z=U×V.

Next, new parameter values are calculated based on the calculated expected value.

$$S = \left\{ \sum_{i=1}^{I} \sum_{j=1}^{J} \sum_{k=1}^{H_{ijk}} (x_{ijk} - \mu) E_{U|X,\theta_t}[u_i]^T - \sum_{i=1}^{I} \sum_{j=1}^{J} \sum_{k=1}^{H_{ijk}} T E_{U,V|X,\theta_t}[v_j u_i^T] \right\} \{E_{U|X,\theta_t}[u_i u_i^T]\}^{-1}. \qquad (8)$$

$$T = \left\{ \sum_{i=1}^{I} \sum_{j=1}^{J} \sum_{k=1}^{H_{ijk}} (x_{ijk} - \mu) E_{V|X,\theta_t}[v_j]^T - \sum_{i=1}^{I} \sum_{j=1}^{J} \sum_{k=1}^{H_{ijk}} S E_{U,V|X,\theta_t}[u_i v_j^T] \right\} \{E_{V|X,\theta_t}[v_j v_j^T]\}^{-1} \qquad (9)$$

$$\Sigma = \frac{1}{\sum_{i=1}^{I} \sum_{j=1}^{J} \sum_{k=1}^{H_{ijk}} 1} \sum_{i=1}^{I} \sum_{j=1}^{J} \sum_{k=1}^{H_{ijk}} \{(x_{ijk} - \mu)(x_{ijk} - \mu)^T - (x_{ijk} - \mu)[E_{U|X,\theta_t}[u_i]^T S^T + E_{V|X,\theta_t}[v_i]^T T^T]\}. \qquad (10)$$

$$\mu = \frac{\sum_{i=1}^{I} \sum_{j=1}^{J} \sum_{k=1}^{H_{ijk}} x_{ijk}}{\sum_{i=1}^{I} \sum_{j=1}^{J} \sum_{h=1}^{H_{ijk}} 1}. \qquad (11)$$

Then, expected values of expression (6) and (7) are calculated with the new parameters, a cycle is performed until the expected values converge, and it is obtained $\theta = \{\mu, S, T, \Sigma\}$. View components of the views are obtained once the model parameters are obtained:

$$\begin{bmatrix} u_i \\ v_j \end{bmatrix} = \left( I + B^T \sum{}^{-1} B \right)^{-1} B^T \sum{}^{-1} (x_{ijk} - \mu) \qquad (12)$$

2. Application of Multi-view Vector Model

The modeling of multi-view vector according to the present disclosure may be applied to a vector representing any information, for example, a vector representing image or voice. A multi-view vector representing voice may be referred to as a voiceprint. Voiceprint confirmation has been widely applied in many fields, including smart user interface, homeland security, telephone banking and the like. Based on a multi-view voiceprint modeling method according to the present disclosure, a voiceprint recognition method is further provided. That is to say, a likelihood representing whether or not two multi-view voiceprints belong to a same speaker and a same type of text is calculated, and then further decision is made with the likelihood.

In the aforementioned solutions, the multi-view vector $x_{ijk}$ may represent a voiceprint corresponding to a k-th sample of a j-th type of text by an i-th speaker, $u_i$ represents a coefficient of the i-th speaker, and $v_j$ represents a coefficient of the j-th type of text. In this case, in an embodiment, a likelihood representing that at least one view component is the same in two multi-view vectors and a likelihood representing that the at least one view component is different in the two multi-view vectors are calculated by using the population mean $\mu$, the parameters of the view components and the parameters of the noise $\epsilon$, and it is determined whether the at least one view component is the same in the two multi-view vectors based on the likelihoods. For example, the above method may be used for determining whether the speaker is the same, i.e., for identity recognition, or may be used for determining whether the speech content is the same, i.e., for voice recognition or password authentication. In addition, the method may be used for more accurate voiceprint recognition, for example, it is required a specific speaker to speak specific content.

Multi-view vector model may be used based on the above different scenarios with model parameters obtained in the above.

Figure 5:
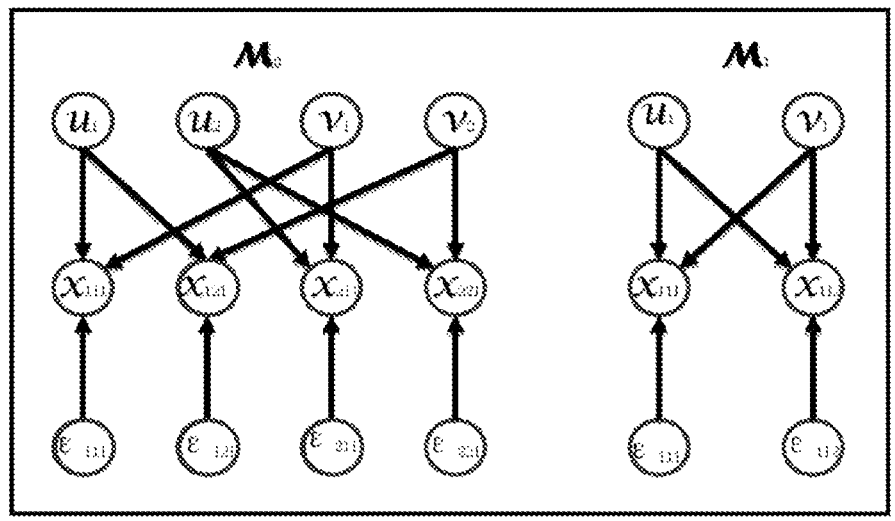
FIG. 5 is a schematic diagram showing two scenarios of a disclosed multi-view vector processing method.

FIG. 5 is a schematic diagram showing a scenario in which it is determined whether two views are both the same. As an example but not intended to limiting, for example, it is determined whether voiceprints each containing two view features of speaker and speech content are completely the same. FIG. 5 corresponds to expression (4). In FIG. 5, $u_1$ and $u_2$ represent special selections for the speaker view, and $v_1$ and $v_2$ represent special selections for the speech content view, x represents various combined language samples, and e represents a final noise item in expression (4). In this case, a left-side mode $M_0$ represents all cases in which one or both two of the speaker and the speech content in four voice segments are different. A right-side mode $M_1$ represents cases in which both of the speaker and the speech content in two voice segments are the same.

In this case, it is calculated a likelihood representing whether two voiceprint segments (target voiceprint $x_s$ and test voiceprint $x_t$) belong to the four cases in mode $M_0$, that is, a likelihood B representing that the two voiceprint segments do not belong to a same speaker or are not a same type of text as follows.

$$P(x_t, x_s \mid M_0) = P(x_{111}, x_{121} \mid M_0) + P(x_{111}, x_{211} \mid M_0) + \qquad (13)$$

$$P(x_{111}, x_{221} \mid M_0) + P(x_{121}, x_{211} \mid M_0) +$$

$$P(x_{121}, x_{221} \mid M_0) + P(x_{211}, x_{221} \mid M_0)$$

$$= \int \int \int \int (P_{x_{111}}, x_{121}, u_1, v_1, v_2, z_{111}, z_{121})$$

$$du_1 dv_1 dv_2 dz_{111} dz_{121} + \dots$$

-continued $$= \mathcal{N}\left(\begin{bmatrix} x_t \\ x_s \end{bmatrix} \middle| \begin{bmatrix} \mu \\ \mu \end{bmatrix}, \begin{bmatrix} 2SS^T + TT^T + \Sigma & 2SS^T + TT^T \\ 2SS^T + TT^T & 2SS^T + TT^T + \Sigma \end{bmatrix}\right) +$$

$$\mathcal{N}\left(\begin{bmatrix} x_t \\ x_s \end{bmatrix} \middle| \begin{bmatrix} \mu \\ \mu \end{bmatrix}, \begin{bmatrix} SS^T + 2TT^T + \Sigma & SS^T + 2TT^T \\ SS^T + 2TT^T & SS^T + 2TT^T + \Sigma \end{bmatrix}\right) +$$

$$\mathcal{N}(x_t \mid \mu, SS^T + TT^T + \Sigma)\mathcal{N}(x_s \mid \mu, SS^T + TT^T + \Sigma)$$

Moreover, it is calculated a likelihood representing whether two voiceprint segments (target voiceprint $x_s$ and test voiceprint $x_t$) belong to the cases in mode $M_1$, i.e., a likelihood A representing whether the two voiceprint segments belong to a same speaker and a same type of text as follows.

$$P(x_t, x_s \mid M_1) = \int\int\int\int P(x_{111}, x_{112}, u_1, v_1, z_{111}, z_{112}) \quad (14)$$
$$du_1 dv_1 dz_{111} dz_{112}$$
$$= \mathcal{N}\left(\begin{bmatrix} x_t \\ x_s \end{bmatrix} \middle| \begin{bmatrix} \mu \\ \mu \end{bmatrix}, \begin{bmatrix} SS^T + TT^T + \Sigma & SS^T + TT^T \\ SS^T + TT^T & SS^T + TT^T + \Sigma \end{bmatrix}\right)$$

If A>B, the two voiceprint segments belong to the same speaker and the same type of text. If A<B, then the two voiceprint segments do not belong to the same speaker or do not belong to the same type of text.

Probabilities that the two multi-view vectors belong to the cases may be further calculated based on the likelihood, and it is determined whether both of the two view components of the two multi-view vectors are the same or at least one view component is different based on the probabilities. For example, $$P(M_q \mid x_t, x_s) = \frac{P(x_t, x_s \mid M_q)P(M_q)}{P(x_t, x_s \mid M_0)P(M_0) + P(x_t, x_s \mid M_1)P(M_1)}, q = 0, 1 \quad (15)$$

If $P(M_1|x_t,x_s)>P(M_0|x_t,x_s)$, that is, a probability representing that $x_s$ and $x_t$ belong to mode $M_1$ is greater than a probability representing that $x_s$ and $x_t$ belong to mode $M_0$, then the two voiceprint segments are completely the same, that is, the two voiceprint segments are from the same speaker and have the same content.

As described in the above, with the determined multi-view vector model parameters, the likelihood representing that one of two view components is the same in two multi-view vectors and the likelihood representing that the one of two view components is different in the two multi-view vectors may be calculated, and whether the one view component is the same in the two multi-view vectors is determined based on the likelihoods. In addition, the probability representing that the two multi-view vectors belong to the cases may be further calculated with the likelihoods, and it is determined whether the one view component is the same based on the probability.

A likelihood representing that the view component $u_i$ is the same, A=

$$\mathcal{N}\left(\begin{bmatrix} x_t \\ x_s \end{bmatrix} \middle| \begin{bmatrix} \mu \\ \mu \end{bmatrix}, \begin{bmatrix} 2SS^T + TT^T + \Sigma & 2SS^T + TT^T \\ 2SS^T + TT^T & 2SS^T + TT^T + \Sigma \end{bmatrix}\right) \quad (16)$$

A likelihood representing that the view component $u_i$ is different, B=

$$= \mathcal{N}\left(\begin{bmatrix} x_t \\ x_s \end{bmatrix} \middle| \begin{bmatrix} \mu \\ \mu \end{bmatrix}, \begin{bmatrix} SS^T + 2TT^T + \Sigma & SS^T + 2TT^T \\ SS^T + 2TT^T & SS^T + 2TT^T + \Sigma \end{bmatrix}\right) + \quad (17)$$

$$\mathcal{N}(x_t \mid \mu, SS^T + TT^T + \Sigma)\mathcal{N}(x_s \mid \mu, SS^T + TT^T + \Sigma)$$

The view component $u_i$ is the same if A>B, and the view component $u_i$ is different if A<B. The calculation of likelihoods for the view component $v_j$ is similar to The calculation of likelihoods for the view component $u_i$.

3. Extraction of Multi-view Vector

The multi-view vector may be obtained by directly vectorizing a to-be-represented object. As an example but not intended to limiting, for example, acquired voice data may be processed in the following way, to obtain one of examples of multi-view vector, voiceprint. A voiceprint may be extracted with for example the aforementioned method of extracting MFCCs. Of course, it should be understood by those skilled in the art that, the voice data may be processed with other methods known in the art, which are not described hereinafter.

When being extracted directly from an object containing information on multiple non-discrete views, a multi-view vector can entirely represent the object. Then, the multi-view vector is modeled based on a large quantity of object samples with a modeling method according to the present disclosure, to reflect effects on the multi-view vector by features of different views. In this case, a model obtained by the modeling can be applied to a test object to recognize or use features of one or more views of the test object.

That is to say, for example, in the case that the feature of an object is affected by non-discrete view A and view B, it is not sought according to the present disclosure to directly extract an A-view feature from the object which is not affected by the view B as much as possible, or to directly extract a B-view feature from the object which is not affected by the view A as much as possible, or to mark samples with the view A and view B to obtain classifiers respectively for view A and view B by training. Reversely, it is accepted by the present disclosure a fact of the non-discrete view A and view B in the extraction of features of the object, to extract the features of the objects together and form a multi-view vector. Then, effects by the view A and view B are measured with the modeling method according to the present disclosure.

However, in some cases, an object without any processing may be affected by various factors, some of these factors are relatively discrete and some are relatively non-discrete. In this case, if other relatively discrete views are included, calculation amount for modeling and vector decomposition may be unnecessarily increased, and it may become impossible to solve an issue due to excessive increase of variables. In this case, it may be considered to firstly separate relatively non-discrete views from the multi-view vector at the extraction of multi-view vector.

In a method, a feature vector obtained by directly vectorizing an object is processed with a classifier, to obtain a multi-view vector in which relatively discrete views are excluded and relatively non-discrete views are reserved. In other words, a discreteness between the excluded views and the multiple views of the multi-view vector is higher than a discreteness between the multiple views of the multi-view vectors. It should be noted that, the relatively discrete and relatively non-discrete are both relative concepts, and are not absolute "discrete" and "non-discrete". Even in some cases, for example, in the case of too many views, all of the views may be non-discrete. In this case, it is determined depending on a selection of a user to exclude which views and reserve which views.

Figure 6A:
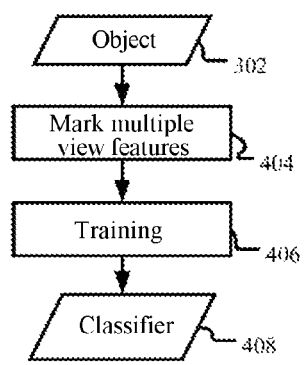
FIG. 6A is a schematic flowchart of a multi-view vector processing method according to a disclosed embodiment.

As shown in FIG. 6A, the classifier may be obtained by training in the following way. Firstly, features of multiple non-discrete views of a training sample, i.e., research object (302) are marked simultaneously (404). A discreteness between unmarked views and the marked views may be higher than a discreteness between the marked views. Then, the classifier is trained by using the marked training samples (406), to obtain a trained classifier (408).

The above classifier may be a neural network. In a training phase, the training samples are marked, for example, interested views are marked. For instance, interested age and sex may be marked for an image of people. The neural network is trained with these marked image samples. In this way, a multi-view vector, of the image, containing two views of age and sex can be obtained by processing a test image with the trained neural network. In addition, a multi-view vector may be extracted for a voice. Depending on marked feature views of samples in training the neural network, such as age, sex, race, personal identity, language and voice content, a multi-view vector obtained by processing test voice samples with the trained neural network includes these selected features of the views.

Figure 6B:
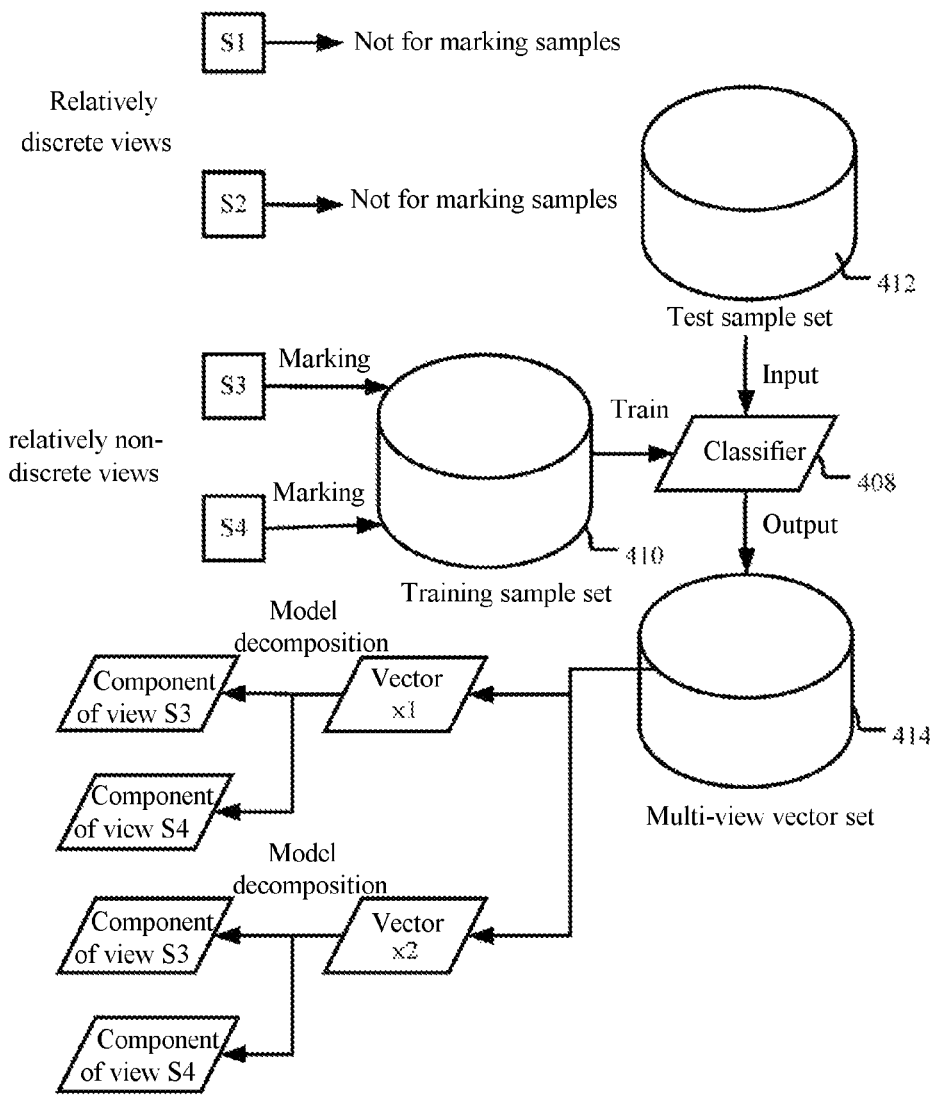
FIG. 6B is a schematic flowchart of a multi-view vector processing method according to a disclosed embodiment.

FIG. 6B shows an entire structure from training of classifier to multi-view vector decomposition. In a classifier training phase, training samples are marked with non-discrete views S3 and S4 instead of discrete views S1 and S2, and a training sample set 410 is obtained to train a classifier 408. Test samples in a test sample set 412 is processed by the classifier 408 to obtain a multi-view vector set 414 containing information on the view S3 and view S4. A process that a multi-view vector decomposition model is trained based on vectors in the multi-view vector set 414 is not shown in FIG. 6B. A multi-view vector may be decomposed based on the model. For example, vector x1 and vector x2 (the vectors x1 and x2 may be from the multi-view vector set 414 or may be multi-view vectors newly extracted by the classifier 408 in an actual application) may be decomposed into components of the view S3 and view S4. Such decomposition for view components may be apparent, for example, a certain view component or each view component needs to be obtained for some application. The decomposition for view components may be implicit, for example, in the embodiment of voiceprint comparison described herein, although the voiceprint is not decomposed apparently, it is actually decomposed in the calculations of a likelihood representing that the view is the same in the voiceprints and the likelihood representing that the view is different in the voiceprints.

4. Multi-view Vector Processing Device

The methods discussed above may be implemented completely by computer executable programs, or may be partially or completely implemented by hardware and/or firmware. When the methods are implemented by hardware and/or firmware or the computer executable programs are loaded to a hardware device in which programs can be executed, a multi-view vector processing device to be described is implemented. Hereinafter, the summary of the device is given without repeating some details discussed above. However, it should be noted that, although the device can execute the aforementioned methods, the methods may not include parts of the described device or are not always executed by the parts of the described device.

A multi-view vector processing device is provided according to an embodiment. A multi-view vector x represents an object containing information on at least two non-discrete views. The device includes a training apparatus for training a multi-view vector model. The multi-view vector model contains at least components of: a population mean $\mu$ of the multi-view vector, view component of each view of the multi-view vector and noise $\epsilon$. The training device obtains the population mean $\mu$, parameters of each view component and parameters of the noise $\epsilon$ by using training data for the multi-view vector x.

Similarly, the population mean $\mu$ may be set as zero. The view component corresponding to the view may be based on a product of a space basis Si corresponding to the view and a coefficient $u_i$ specially selected for the view, where i represents a sequence number of the view. The noise may be set to meet a Gauss distribution taking a diagonal matrix $\Sigma$ as a covariance.

In an embodiment, the training apparatus may be configured to obtain the population mean $\mu$, the space basis Sn of the views and the $\Sigma$ based on the training data by using an expectation-maximization algorithm. In the expectation-maximization algorithm, mean expected values of all samples for x with respect to the special selections for the view component and expected values related to covariance with respect to the special selections for the view component can be calculated based on $\mu$, $S_n$ and $\Sigma$, and $\mu$, $S_n$ and $\Sigma$ are recalculated based on the expected values until they converge.

The multi-view vector includes a representation of the multi-view vector model and distributions of various parameters and variables in the model in the case of two views, which may refer to the description of the methods in the above and are not described hereinafter.

In another embodiment, a device for determining whether at least one view component is the same is provided according to another embodiment. The device includes a likelihood estimation apparatus and a determination apparatus. The likelihood estimation apparatus is configured to calculate a likelihood representing that at least one view component is the same in two multi-view vectors and a likelihood representing that the at least one view component is different in two multi-view vectors, by using the population mean $\mu$, parameters of each view component and parameters of the noise $\epsilon$. The determination apparatus is configured to determine whether the at least view component is the same in the two multi-view vectors based on the likelihoods.

The device may further include a probability calculation apparatus configured to calculate a probability representing that at least one view component is the same in the two multi-view vectors and a probability representing that the at least one view component is different in the two multi-view vectors, by using the likelihoods. The determination unit is configured to determine whether the at least one view component is the same in the two multi-view vectors based on the probabilities.

In an application of determining whether both of the two view components are the same, an operation mode of the device is described in the above embodiment of method, and is not described hereinafter. In this case, the device may be a voiceprint confirmation device for confirming whether a test voiceprint is completely the same as a target voiceprint, that is, whether the two view components (speaker and speech content) are completely the same.

Details in the above embodiment have been discussed in detail in the description of the multi-view vector processing method, and are not described hereinafter.

5. Computing Device for Implementing Device and Method According to the Present Disclosure The modules and units of the above apparatuses may be configured with software, firmware, hardware or a combination thereof. The configuration may be made with means or modes well known to those skilled in the art, and is not described hereinafter. In the case where the modules and units are realized by software or firmware, a program constituting the software is installed in a computer with a dedicated hardware structure (e.g. the general computer 700 shown in FIG. 7) from a storage medium or network, and the computer is capable of implementing various functions when being installed with various programs.

Figure 7:
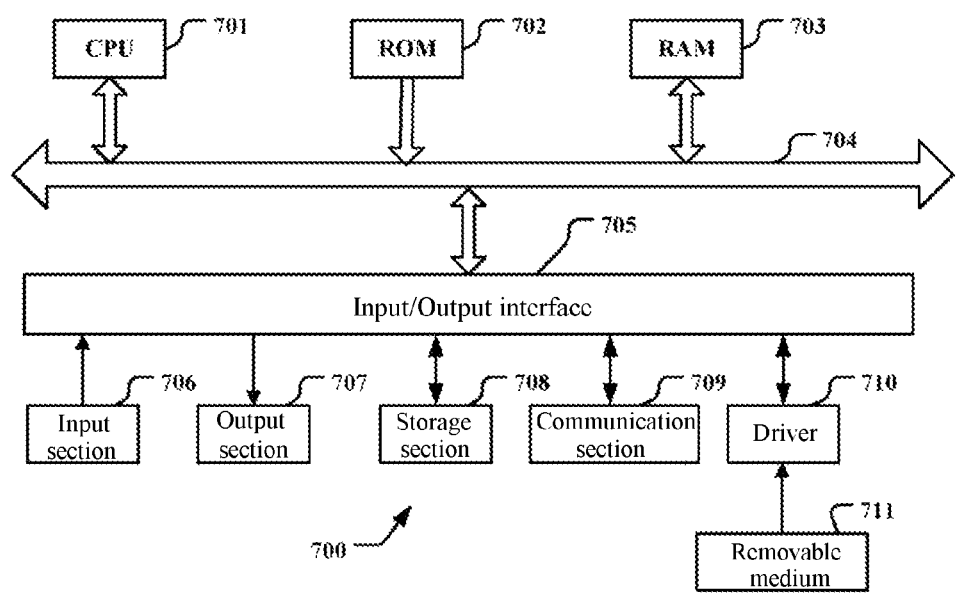
FIG. 7 is a block diagram of an exemplary structure of a general-purpose personal computer in which a method and/or device according to an embodiment of the present disclosure can be implemented.

In FIG. 7, a central processing unit (CPU) 701 executes various processing according to a program stored in a read-only memory (ROM) 702 or a program loaded to a random access memory (RAM) 703 from a memory section 708. The data needed for the various processing of the CPU 701 may be stored in the RAM 703 as needed. The CPU 701, the ROM 702 and the RAM 703 are linked with each other via a bus 704. An input/output interface 705 is also linked to the bus 704.

The following components are linked to the input/output interface 705: an input section 706 (including keyboard, mouse and the like), an output section 707 (including displays such as a cathode ray tube (CRT), a liquid crystal display (LCD), a loudspeaker and the like), a memory section 708 (including hard disc and the like), and a communication section 709 (including a network interface card such as a LAN card, a modem and the like). The communication section 709 performs communication processing via a network such as the Internet. A driver 710 may also be linked to the input/output interface 705, if needed. If needed, a removable medium 711 such as a magnetic disc, an optical disc, a magnetic optical disc and a semiconductor memory may be installed in the driver 710, so that the computer program read therefrom is installed in the memory section 708 as needed.

In the case where the foregoing series of processing is achieved with software, programs forming the software are installed from a network such as the Internet or a memory medium such as the removable medium 711.

It should be appreciated by those skilled in the art that the memory medium is not limited to the removable medium 711 shown in FIG. 7, which has program stored therein and is distributed separately from the apparatus so as to provide the programs to users. The removable medium 711 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 702 and the memory section 708 in which programs are stored, and can be distributed to users along with the device in which they are incorporated.

In addition, computer program codes and a computer program product storing machine-readable instruction codes are further provided according to the present disclosure. The method according to the above embodiments of the present disclosure can be performed when the instruction codes are read and executed by a machine.

Accordingly, a storage medium for carrying the program product in which machine-readable instruction codes are stored is also included in the present disclosure. The storage medium includes but is not limited to floppy, optical disc, magnetic optical disc, memory card, memory stick and the like.

A computing device including the above storage medium is also included in the present disclosure. For example, a multi-view vector processing device includes a processor and a storage medium storing program codes. The aforementioned method is implemented when the program codes are executed by the processor.

With the above descriptions, the embodiments of the present disclosure provide, but are not limited to, the following technical solutions.

Appendixes:

1. A multi-view vector processing method, where a multi-view vector x represents an object containing information on at least two non-discrete views, and the method includes:

a modeling step for establishing a model of the multi-view vector, where the model includes at least components of: a population mean $\mu$ of the multi-view vector, view component of each view of the multi-view vector and noise $\epsilon$; and a training step for obtaining the population mean $\mu$, parameters of each view component and parameters of the noise $\epsilon$, by using training data of the multi-view vector x.

2. The method according to appendix 1, where the population mean $\mu$ is set as zero.

3. The method according to appendix 1, where the view component of each view is based on a product of a space basis $S_i$ corresponding to the view and a coefficient $u_i$ specially selected for the view, where i is a sequence number of the view.

4. The method according to appendix 3, where the noise is set to meet a Gauss distribution taking a diagonal matrix $\Sigma$ as a covariance.

5. The method according to appendix 4, where the training step includes: obtaining the population mean $\mu$, space base $S_n$ of each view and the $\Sigma$, based on the training data by using an expectation-maximization algorithm.

6. The method according to appendix 5, where in the expectation-maximization algorithm, mean expected values of all samples for x with respect to the special selection for each view component and expected values related to covariance with respect to the special selection for each view component can be calculated based on $\mu$, $S_n$ and $\Sigma$, and $\mu$, $S_n$ and $\Sigma$ are recalculated based on the expected values until they converge.

7. The method according to appendix 4, where the multi-view vector includes two views and space bases of the two views are respectively recorded as S and T, and the multi-view vector is represented as:

$$x_{ijk} = \mu + Su_i + Tv_j + \epsilon_{ijk}$$

where $\mu$ represents the population mean, $u_i$ represents a coefficient corresponding to an i-th selection for the view corresponding to the space basis S, $v_j$ represents a coefficient corresponding to a j-th selection for the view corresponding to the space basis T, $\epsilon_{ijk}$ represents the noise, and k represents a k-th sample under the i-th selection and the j-th selection.

8. The method according to appendix 7, where if $\theta = \{\mu, S, T, \Sigma\}$ and B=[S T], then the following distribution is met:

$$P(x_{ijk}|u_i, v_j, \theta) = \mathcal{N}(x_{ijk}|\mu + Su_i + Tv_j, \Sigma),$$

$$P(u_i) = \mathcal{N}(u_i|0, I),$$

$$P(v_j) = \mathcal{N}(v_j|0, I),$$

where $\mathcal{N}(x|\mu, \Sigma)$ is a normal distribution with a mean of $\mu$ and a variance of $\Sigma$, and I is a unit matrix.

9. The method according to appendix 7, where the multi-view vector $x_{ijk}$ represents a voiceprint for a k-th sample of a j-th type of text by an i-th speaker, $u_i$ is a coefficient of the i-th speaker and $v_j$ is a coefficient of the j-th type of text.

10. The method according to any one of appendixes 1 to 9, further including;
calculating a likelihood representing that at least one view component is the same in two multi-view vectors and a likelihood representing that the at least one view component is different in the two multi-view vectors, by using the population mean $\mu$, the parameters of each view component and the parameters of the noise $\epsilon$; and
determining whether the at least one view component is the same in the two multi-view vectors based on the likelihoods.

11. The method according to appendix 10, further including calculating a probability representing that at least one view component is the same in two multi-view vectors and a probability representing that the at least one view component is different in the two multi-view vectors based on the likelihoods, and determining whether the at least one view component is the same in the two multi-view vectors based on the probabilities.

12. The method according to appendix 10, further including: determining whether all of the view components are the same in the two multi-view vectors.

13. The method according to appendix 8, further including:
calculating a likelihood representing that the two view components both are the same in two multi-view vectors and a likelihood representing that the two view components are not both the same in the two multi-view vectors based on the determined parameters of the multi-view vector model, and determining whether the two view components are both the same in the two multi-view vectors based on the likelihoods, where
the likelihood representing that all of the view components are the same, $$A = \mathcal{N}\left(\begin{bmatrix} x_t \\ x_s \end{bmatrix} \middle| \begin{bmatrix} \mu \\ \mu \end{bmatrix}, \begin{bmatrix} SS^T + TT^T + \Sigma & SS^T + TT^T \\ SS^T + TT^T & SS^T + TT^T + \Sigma \end{bmatrix}\right),$$

and
the likelihood representing that at least one view component is different, $$B = \mathcal{N}\left(\begin{bmatrix} x_t \\ x_s \end{bmatrix} \middle| \begin{bmatrix} \mu \\ \mu \end{bmatrix}, \begin{bmatrix} 2SS^T + TT^T + \Sigma & 2SS^T + TT^T \\ 2SS^T + TT^T & 2SS^T + TT^T + \Sigma \end{bmatrix}\right) +$$

$$\mathcal{N}\left(\begin{bmatrix} x_t \\ x_s \end{bmatrix} \middle| \begin{bmatrix} \mu \\ \mu \end{bmatrix}, \begin{bmatrix} SS^T + 2TT^T + \Sigma & SS^T + 2TT^T \\ SS^T + 2TT^T & SS^T + 2TT^T + \Sigma \end{bmatrix}\right) +$$

$$\mathcal{N}(x_t|\mu, SS^T + TT^T + \Sigma)\mathcal{N}(x_s|\mu, SS^T + TT^T + \Sigma)$$

where $x_t$ represents a test vector and $x_s$ represents a target vector.

14. The method according to appendix 8, further including:
calculating a likelihood representing that one of the two view components is the same in two multi-view vectors and a likelihood representing that the one of the two view components is different in the two multi-view vectors based on the determined parameters of the multi-view vector model, and determining whether the one of the two view components is the same in the two multi-view vectors based on the likelihoods, where
a likelihood representing that the view component $u_i$ is the same, $$A = \mathcal{N}\left(\begin{bmatrix} x_t \\ x_s \end{bmatrix} \middle| \begin{bmatrix} \mu \\ \mu \end{bmatrix}, \begin{bmatrix} 2SS^T + TT^T + \Sigma & 2SS^T + TT^T \\ 2SS^T + TT^T & 2SS^T + TT^T + \Sigma \end{bmatrix}\right),$$

and
a likelihood representing that the view component $u_i$ is different, $$B = \mathcal{N}\left(\begin{bmatrix} x_t \\ x_s \end{bmatrix} \middle| \begin{bmatrix} \mu \\ \mu \end{bmatrix}, \begin{bmatrix} SS^T + 2TT^T + \Sigma & SS^T + 2TT^T \\ SS^T + 2TT^T & SS^T + 2TT^T + \Sigma \end{bmatrix}\right) +$$

$$\mathcal{N}(x_t|\mu, SS^T + TT^T + \Sigma)\mathcal{N}(x_s|\mu, SS^T + TT^T + \Sigma)$$

where $x_t$ represents a test vector, $x_s$ represents a target vector, and calculation for $v_j$ is symmetrical to the calculation for $u_i$.

15. The method according to any one of appendixes 1 to 9, where the multi-view vector is obtained by directly vectorizing an object to be represented.

16. The method according to any one of appendixes 1 to 9, where the multi-view vector is obtained by processing a feature vector with a classifier, and the feature vector is obtained by directly vectorizing an object.

17. The method according to appendix 16, where the classifier is configured to relatively separate the multi-view vector from the feature vector obtained by directly vectorizing an object to be represented, and a discreteness between an excluded view and the views of the multi-view vector is higher than a discreteness between the views of the multi-view vector.

18. The method according to appendix 16, where the classifier is trained by steps of:

marking simultaneously features of multiple non-discrete views of training samples, with a discreteness between unmarked views and marked views is higher than a discreteness between the marked views; and training the classifier with the marked training sample.

19. A multi-view vector processing device, including a processor and a storage medium storing program codes, when being executed by the processor, the program codes implements the method according to any one of appendixes 1 to 17.

20. A computer readable storage medium, storing program codes, where the program codes implements the method according to any one of appendixes 1 to 18 when being executed by a processor.

Finally, to be further noted, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

Although the embodiments of the present disclosure have been described above in detail in connection with the drawings, it shall be appreciated that the embodiments as described above are merely illustrative but not limitative of the present disclosure. Those skilled in the art can make various modifications and variations to the above embodiments without departing from the essence and scope of the present disclosure. Therefore, the scope of the present disclosure is defined merely by the appended claims and their equivalents.

The invention claimed is:

1. A method of multi-view vector processing by a processor, where a multi-view vector x represents an object containing information on at least two non-discrete views, the method comprising:

establishing a model of the multi-view vector x, where the model includes at least components of: a population mean $\mu$ of the multi-view vector x, a view component of a view among the at least two non-discrete views of the multi-view vector x and noise $\epsilon$; and using training data of the multi-view vector x to obtain the population mean $\mu$, parameters of the view component and parameters of the noise $\epsilon$, where, the multi-view vector is obtained by processing a feature vector with a classifier, and the feature vector is obtained by directly vectorizing the object, and the classifier is configured to relatively separate the multi-view vector from the feature vector obtained by directly vectorizing the object to be represented, and a discreteness between an excluded view and the two non-discrete views of the multi-view vector x is higher than a discreteness between the two non-discrete views of the multi-view vector x.

2. The method according to claim 1, where the population mean $\mu$, is set as zero.

3. The method according to claim 1, where the view component of the view is based on a product of a space basis $S_i$ corresponding to the view and a coefficient $u_i$ —selected for the view, where i is a sequence number of the view.

4. The method according to claim 3, where the noise $\epsilon$ is set to meet a Gauss distribution taking a diagonal matrix $\Sigma$ as a covariance.

5. The method according to claim 4, where to use the training data includes: obtaining the population mean $\mu$, space base $S_n$ of the view and the $\Sigma$, based on the training data by using an expectation-maximization algorithm.

6. The method according to claim 5, where in the expectation-maximization algorithm, mean expected values of a plurality of samples for the multi-view vector x with respect to the selected coefficient $u_i$ for the view component of the view, and expected values related to covariance with respect to the selected coefficient $u_i$ for the view component of the view, are calculatable based on $\mu$, $S_n$ and $\Sigma$, and $\mu$, $S_n$ and $\Sigma$ are recalculatable until the mean expected values of the samples for the multi-view vector x and the expected values related to covariance converge.

7. The method according to claim 4, where space bases of the at least two non-discrete views are respectively recorded as S and T, and the multi-view vector x is represented as $$x_{ijk}=\mu+Su_i+Tv_j+\epsilon_{ijk}$$

where $\mu$ represents the population mean, $u_i$ represents a coefficient corresponding to an i-th selection for the view corresponding to the space basis S, $v_j$ represents a coefficient corresponding to a j-th selection for the view corresponding to the space basis T, $\epsilon_{ijk}$ represents the noise $\epsilon$, and k represents a k-th sample under the i-th selection and the j-th selection.

8. The method according to claim 7, where if $\theta=\{\mu, S, T, \Sigma\}$ and B=[S T], then the following distribution is met:

$$P(x_{ijk}|u_i,v_j,\theta)=N(x_{ijk}|\mu+Su_i+Tv_j,\Sigma),$$

$$P(u_i)=N(u_i|0,I),$$

$$P(v_j)=N(v_j|0,I),$$

where $N(x|\mu, \Sigma)$ is a normal distribution with a mean of $\mu$, and a variance of $\Sigma$, and I is a unit matrix.

9. The method according to claim 7, where the multi-view vector $x_{ijk}$ represents a voiceprint for a k-th sample of a j-th type of text by an i-th speaker, $u_i$ is a coefficient of the i-th speaker and $v_j$ is a coefficient of the j-th type of text.

10. The method according to claim 1, further including;

calculating a first likelihood representing that at least one view component is same among view components of at least two non-discrete views in two multi-view vectors and a second likelihood representing that the at least one view component is different among the view components of the at least two non-discrete views in the two multi-view vectors, by using population mean $\mu$, parameters of a view component and parameters of noise $\epsilon$ of respective two multi-view vectors; and determining whether the at least one view component is same in the two multi-view vectors based on the first and second likelihoods.

11. The method according to claim 10, further including calculating a first probability representing that at least one view component is same among view components of at least two non-discrete views in the two multi-view vectors and a second probability representing that the at least one view component is different among the view components of the at least two non-discrete views in the two multi-view vectors based on the calculated first and second likelihoods, and determining whether the at least one view component is same in the two multi-view vectors based on the first and second probabilities.

12. The method according to claim 10, further including: determining whether at least two of the view components are same among view components of at least two non-discrete views in the two multi-view vectors.

13. The method according to claim 8, further including: calculating a first likelihood representing that two view components both are same among view components of at least two non-discrete views in two multi-view vectors and a second likelihood representing that the two view components are different among the view components of the at least two non-discrete views in the two multi-view vectors based on the determined parameters of the multi-view vector model, and determining whether the two view components are both the same in the two multi-view vectors based on the first and second likelihoods, where the first likelihood representing that a plurality of the view components are same, $$A = \mathcal{N}\left(\begin{bmatrix} x_t \\ x_s \end{bmatrix} \middle| \begin{bmatrix} \mu \\ \mu \end{bmatrix}, \begin{bmatrix} SS^T + TT^T + \Sigma & SS^T + TT^T \\ SS^T + TT^T & SS^T + TT^T + \Sigma \end{bmatrix}\right),$$

and the second likelihood representing that at least one of the view components is different, $$B == \mathcal{N}\left(\begin{bmatrix} x_t \\ x_s \end{bmatrix} \middle| \begin{bmatrix} \mu \\ \mu \end{bmatrix}, \begin{bmatrix} 2SS^T + TT^T + \Sigma & 2SS^T + TT^T \\ 2SS^T + TT^T & 2SS^T + TT^T + \Sigma \end{bmatrix}\right) +$$

$$\mathcal{N}\left(\begin{bmatrix} x_t \\ x_s \end{bmatrix} \middle| \begin{bmatrix} \mu \\ \mu \end{bmatrix}, \begin{bmatrix} SS^T + 2TT^T + \Sigma & SS^T + 2TT^T \\ SS^T + 2TT^T & SS^T + 2TT^T + \Sigma \end{bmatrix}\right) +$$

$$\mathcal{N}(x_t | \mu, SS^T + TT^T + \Sigma)\mathcal{N}(x_s | \mu, SS^T + TT^T + \Sigma)$$

where $x_t$ represents a test vector and $x_s$ represents a target vector.

14. The method according to claim 8, further including: calculating a first likelihood representing that one of two view components is same among view components of at least two non-discrete views in two multi-view vectors and a second likelihood representing that the one of the two view components is different among the view components of the at least two non-discrete views in the two multi-view vectors based on the determined parameters of the multi-view vector model, and determining whether the one of the two view components is the same in the two multi-view vectors based on the first and second likelihoods, where the first likelihood representing that the one view component $u_i$ is the same, $$A = \mathcal{N}\left(\begin{bmatrix} x_t \\ x_s \end{bmatrix} \middle| \begin{bmatrix} \mu \\ \mu \end{bmatrix}, \begin{bmatrix} 2SS^T + TT^T + \Sigma & 2SS^T + TT^T \\ 2SS^T + TT^T & 2SS^T + TT^T + \Sigma \end{bmatrix}\right),$$

and the second likelihood representing that the one view component $u_i$ is different, $$B == \mathcal{N}\left(\begin{bmatrix} x_t \\ x_s \end{bmatrix} \middle| \begin{bmatrix} \mu \\ \mu \end{bmatrix}, \begin{bmatrix} SS^T + 2TT^T + \Sigma & SS^T + 2TT^T \\ SS^T + 2TT^T & SS^T + 2TT^T + \Sigma \end{bmatrix}\right) +$$

$$\mathcal{N}(x_t | \mu, SS^T + TT^T + \Sigma)\mathcal{N}(x_s | \mu, SS^T + TT^T + \Sigma)$$

where $x_t$ represents a test vecto, $x_s$ represents a target vector, and calculation for $v_j$ is symmetrical to the calclation for $u_i$.

15. The method according to claim 1, where the multi-view vector is obtained by directly vectorizing the object to be represented.

16. The method according to claim 1, where the classifier is trained by:
simultaneously marking features of multiple non-discrete views of training samples, with a discreteness between unmarked views and marked views is higher than a discreteness between the marked views; and
training the classifier with the marked training sample.

17. A multi-view vector processing device, including a processor and a non-transitory storage medium storing program codes, which when being executed by the processor, cause the processor to control:
establishing a model of the multi-view vector x, where the model includes at least components of: a population mean μ of the multi-view vector x, a view component of a view among the at least two non-discrete views of the multi-view vector x and noise $\boldsymbol{\epsilon}$; and
using training data of the multi-view vector x to obtain the population mean μ, parameters of the view component and parameters of the noise $\boldsymbol{\epsilon}$,
where,
the multi-view vector is obtained by processing a feature vector with a classifier, and the feature vector is obtained by directly vectorizing the object, and
the classifier relatively separates the multi-view vector from the feature vector obtained by directly vectorizinq the object to be represented, and a discreteness between an excluded view and the two non-discrete views of the multi-view vector x is higher than a discreteness between the two non-discrete views of the multi-view vector x.

18. A non-transitory computer readable storage medium, storing program codes, where the program codes implements a method when being executed by a processor, by:
establishing a model of the multi-view vector x, where the model includes at least components of: a population mean μ of the multi-view vector x, a view component of a view among the at least two non-discrete views of the multi-view vector x and noise $\boldsymbol{\epsilon}$; and
using training data of the multi-view vector x to obtain the population mean μ, parameters of the view component and parameters of the noise $\boldsymbol{\epsilon}$,
where,
the multi-view vector is obtained by processing a feature vector with a classifier, and the feature vector is obtained by directly vectorizinq the object, and
the classifier relatively separates the multi-view vector from the feature vector obtained by directly vectorizinq the object to be represented, and a discreteness between an excluded view and the two non-discrete views of the multi-view vector x is higher than a discreteness between the two non-discrete views of the multi-view vector x.

* * * * *